United States Patent
Faust et al.

(10) Patent No.: US 7,417,092 B2
(45) Date of Patent: Aug. 26, 2008

(54) END-CAPPED POLYMER CHAINS AND PRODUCTS THEREOF

(75) Inventors: Rudolf Faust, Lexington, MA (US); Axel H. E. Mueller, Wiesbaden (DE)

(73) Assignee: University of Massachusetts Lowell, Lowell, MA (US)

( * ) Notice: Subject to any disclaimer, the term of this patent is extended or adjusted under 35 U.S.C. 154(b) by 0 days.

(21) Appl. No.: 10/872,134

(22) Filed: Jun. 18, 2004

(65) Prior Publication Data

US 2005/0143526 A1 Jun. 30, 2005

Related U.S. Application Data

(60) Provisional application No. 60/480,121, filed on Jun. 20, 2003.

(51) Int. Cl.
*C08F 293/00* (2006.01)

(52) U.S. Cl. ............ 525/280; 525/284; 525/288; 525/294; 525/319; 525/342

(58) Field of Classification Search ............ 525/299, 525/280, 288, 294, 319, 342, 284
See application file for complete search history.

(56) References Cited

U.S. PATENT DOCUMENTS

| | | | |
|---|---|---|---|
| 4,129,557 A | 12/1978 | Kudo et al. | |
| 4,182,818 A | 1/1980 | Tung et al. | |

(Continued)

FOREIGN PATENT DOCUMENTS

| | | |
|---|---|---|
| EP | 0 024 120 | 2/1981 |

(Continued)

OTHER PUBLICATIONS

Allen, RD, et al. Preparation of High Purity, Anionic Polymerization Grade Alkyl Methacrylate Monomers. *Polymer Bull.*, 1986, 15:127-34.

(Continued)

*Primary Examiner*—Jeffrey C Mullis
(74) *Attorney, Agent, or Firm*—Lahive & Cockfield LLP; Giulio A. DeConti, Jr.; Danielle L. Herritt

(57) ABSTRACT

Methods are described herein for converting carbocationically terminated polymers to anionically terminated polymers. These methods comprise: (a) providing a carbocationically terminated polymeric moiety; (b) reacting the carbocationically terminated polymeric moiety with a heterocyclic compound of the formula

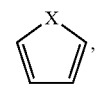

where —X— is selected from —S—, —O—, —NH— and —NR—, and where R is an alkyl group or an aryl group, thereby providing an end-capped polymeric moiety; and (c) reacting the end-capped polymeric moiety with an organolithium compound to yield an anionically terminated polymeric moiety. Also described are block copolymers in which a first polymer block comprising cationically polymerized monomers is linked to a second polymer block comprising anionically polymerized monomers by a

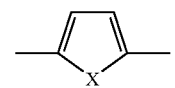

group, as well as a polymer in which a polymer block comprising cationically polymerized monomers is linked to a halogenated silane residue or a carbosilane residue by a

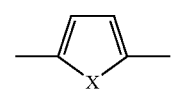

group.

4 Claims, 10 Drawing Sheets

U.S. PATENT DOCUMENTS

| | | | |
|---|---|---|---|
| 4,568,732 | A | 2/1986 | Kennedy et al. |
| 4,910,321 | A | 3/1990 | Faust et al. |
| 4,965,340 | A | 10/1990 | Matsuda |
| 5,122,572 | A | 6/1992 | Faust et al. |
| 5,428,111 | A | 6/1995 | Faust et al. |
| 5,451,647 | A | 9/1995 | Faust et al. |
| 5,637,647 | A | 6/1997 | Faust |
| 5,665,837 | A | 9/1997 | Faust et al. |
| 5,677,386 | A | 10/1997 | Faust |
| 5,690,861 | A | 11/1997 | Faust |
| 5,700,625 | A | 12/1997 | Sato et al. |
| 5,777,044 | A | 7/1998 | Faust |
| 5,981,785 | A | 11/1999 | Faust et al. |
| 6,025,437 | A | 2/2000 | Hirahara et al. |
| 6,046,281 | A | 4/2000 | Faust et al. |
| 6,051,657 | A | 4/2000 | Faust et al. |
| 6,194,597 | B1 | 2/2001 | Faust et al. |
| 6,268,451 | B1 | 7/2001 | Faust et al. |
| 6,469,115 | B1 | 10/2002 | Faust et al. |
| 6,750,267 | B2 | 6/2004 | Faust et al. |
| 2001/0047069 | A1 | 11/2001 | Chung et al. |
| 2002/0107330 | A1 | 8/2002 | Pinchuk et al. |
| 2003/0088032 | A1* | 5/2003 | Luebben et al. ............ 525/410 |
| 2003/0235602 | A1 | 12/2003 | Schwarz |

FOREIGN PATENT DOCUMENTS

| | | |
|---|---|---|
| EP | 0 379 250 A | 7/1990 |
| EP | 0 877 294 | 11/1998 |
| EP | 0 931 581 | 7/1999 |
| JP | 50092877 | 7/1975 |
| JP | 63049228 | 3/1988 |
| JP | 11176750 | 7/1999 |
| WO | WO 93/02110 | 2/1993 |
| WO | WO 95/17436 | 6/1995 |
| WO | WO 99/09074 | 2/1999 |
| WO | WO 99/24480 | 5/1999 |
| WO | WO 00/32609 | 6/2000 |
| WO | WO 00/32654 | 6/2000 |
| WO | WO 00/63256 | 10/2000 |
| WO | WO 01/87999 | 11/2001 |
| WO | WO 02/28924 | 4/2002 |
| WO | WO 03/011596 | 2/2003 |
| WO | WO 2004/113400 | 12/2004 |
| WO | WO 2005/012373 | 2/2005 |

OTHER PUBLICATIONS

Asthana, A, et al. Star-block Polymers of Multiple Polystyrene-b-polyisobutylene Arms Radiating from a Polydivinylbenzene Core. *J. Polymer. Sci. Part A: Polym. Chem.*, 1999, 37:2235-43.

Auschra, C, et al. Synthesis of Block Copolymers with Poly(methyl methacrylate): P(B-b-MMA), P(EB-b-MMA), P(S-b-B-b-MMA) and P(S-bEB-b-MMA). *Polymer Bull.*, 1993, 30:257-64.

Bae, YC, et al. Halogen-free Polyiosbutylene by in situ Methylation of Living Polyisobutylene Using Dimethyl Zinc. *Polymer Bull.*, 2000, 44:453-59.

Bae, YC, et al. Addition Reaction of Living Polyisobutylene to "Double" Diphenylethylenes. Synthesis of 1,1-Diphenylethylene-Functionalized Polyisobutylene Macromonomers. *Macromolecules*, 1998, 31:9379-83.

Bae, YC, et al. Living Coupling Reaction in Living Castionic Polymerization. 2. Synthesis and Characterization of Amphiphilic $A_2B_2$ Star-Block Copolymer: Poly[bis(isobutylene)-*star*-bis(methyl vinyl ether)]. *Macromolecules*, 1998, 31,2480-87.

Chen, X, et al. Block Copolymers of Styrene and *p*-acetoxystyrene with Polyisobutylene by Combination of Living Carbocationic and Atom Transfer Radical Polymerizations. *Macromol. Chem., Rapid Commun.*, 1998, 19:585-89.

Coca, S, et al. Block Copolymers by Transformation of "Living" Carbocationic into "Living" Radical Polymerization. II. ABA-type Block Copolymers Comprising Rubbery Polyisobutylene Middle Segment. *J. Polymer. Sci. Part A: Polym. Chem.*, 1997, 35(16):3595-3601.

Falkenhagen, J, et al. Characterization of Block Copolymers by Liquid Adsorption Chromatography at Critical Conditions. 1. Diblock Copolymers. *Macromolecules*, 2000, 33:3687-93.

Faust, R, et al. Living Carbocationic Polymerization. III. Demonstration of the Living Polymerization of Isobutylene. *Polym. Bull.*, 1986, 15:317-23.

Feldthusen, J, et al. Synthesis of Liner and Star-Shaped Block Copolymers of Isobutylene and Methacrylates by combination of Living Cationic and Anionic Polymerizations. *Macromolecules*, 1998, 31:578-85.

Feldthusen, J, et al. Stable Carbanions by Quantitative Metalation on Cationically Obtained Diphenylvinyl and Diphenylmethoxy Compounds: New Initiators for Living Anionic Polymerizations. *Macromolecules*, 1997, 30 :6989-93.

Fishbein, L, et al. The Relationship of Structure to Some Physical and Mechanical Properties of Poly (vinyl alkyl ethers). *Makromol Chem.*, 1961, 48:221-28.

Fodor, Z, et al. Polyisobutylene-based Thermoplastic Elastomers. II. Synthesis and Characterization of Poly(*p*-methylstyrene-*block*-isobutylene-block-*p*-methylstyrene) Triblock Copolymers. *J. Macromol. Sci., Pure Appl. Chem.*, 1995, A32(3):575-91.

Fodor, Z, et al. Synthetic Applications of Non-polymerizable Monomers in Living Carbocationic Polymerization. Polymer Preprints, 1994, 35(2): 492-93.

Fodor, Z, et al. Living Carbocationic Polymerization of *p*-methylstyrene and Sequential Block Copolymerization of Isobutylene with *p*-Methylstyrene. *J. Macromol. Sci., Pure Appl. Chem.*, 1994, A31(12):1985-2000.

Gyor, M; et al. Polyisobutylene-based Thermoplastic Elastomers. I. Synthesis and Characterization of Polystyrene-Polyisobutylene-Polystyrene Triblock Copolymers. *J. Macromol Sci.*, 1994, A31(12):2055-65.

Gyor, M, et al. Living Carbocationic Polymerization of Isobutylene with Blocked Bifunctional Initiators in the Presence of di-*tert*-butylpyridine as a Proton Trap. *J. Macromol. Sci., Pure Appl. Chem.*, 1992, A29(8):639-53.

Hadjikyriacou, S; et al. Living Coupling Reaction in Living Cationic Polymerization. 3. Coupling Reaction of Living Polyisobutylene Using Bis(furanyl) Derivatives. *Macromolecules* 2000, 33:730-33.

Hadjikyriacou, S; et al. Cationic Macromolecular Design and Synthesis Using Furan Derivatives. *Macromolecules* 1999, 32:6393-99.

Hadjikyriacou, S, et al. Amphiphilic Block Copolymers by Sequential Living Cationic Polymerization: Synthesis and Characterization of Poly(isobutylene-*b*-methyl vinyl ether) *Macromolecules*, 1996, 29:5261-67.

Hadjikyriacou, S, et al. Living Cationic Homopolymerization of Isobutyl Vinyl Ether as Sequential Block Copolymerization of Isobutylene with Isobutyl Vinyl Ether. Synthesis and Mechanistic Studies. *Macromolecules*, 1995, 28:7893-7900.

Hadjikyriacou, S, et al. Synthetic Applications of Nonpolymerizable Monomers in Living Cationic Polymerization: Functional Polyisobutylenes by End-quenching. *J. Macromol. Sci., Pure Appl. Chem.* 1995, A32(6):1137-53.

Higashimura, T, et al. Living Cationic Polymerization of 4-*tert*-butoxystyrene and Synthesis of Poly(4-vinylphenol) with Narrow Molecular Weight Distribution. *Makromol. Chem., Suppl.* 1989, 15:127-36.

Hirai, A, et al. Polymerization of Monomers Containing Functional Groups Protected by Trialkylsilyl Groups. 1. Synthesis of Poly(4-vinylphenol) by Means of Anionic Living Polymerization. *Makromol. Chem., Rapid Commun.*, 1982, 3:941-46.

Hirao, A, et al. Polymerization of Monomers Containing Functional Groups Protected by Trialkylsilyl Groups. 5. Synthesis of Poly(20hydroxyethyl methacrylate) with a Narrow Molecular Weight Distribution by Means of Anionic Living Polymerization. *Macromolecules*, 1986, 19:1294-99.

Hsieh, HL, et al. *Anionic Polymerization*. NY: Marcel Dekker, 1996, pp. 307-392, 447-605, and 641-684.

Jung, ME, et al. Generation of the Enolate of Acetaldehyde from Non-carbonyl Substances and C-alkylation, O-acylation and O-silylation. *Tetrahedron Lett.*, 1977, 43:3791-94.

Kaszas, G, et al. Quasiliving Carbocationic Polymerization. XII. Forced Ideal Copolymerization of Isobutylene with Styrene. *J. Macromol. Sci.-Chem.*, 1982-3, A18(9):1367-82.

Kaszas, G, et al. Polyisobutylene-containing Block Polymers by Sequential Monomer Addition. II. Polystyrene-Polyisobutylene-Polystyrene Triblock Polymers: Synthesis, Characterization, and Physical Properties. *J. Polym. Sci., Polym. Chem. Ed.*, 1991, A29(1):427-35.

Kennedy, JP, et al. Polyisobutylene-containing Block Polymers by Sequential Monomer Addition. 8. Synthesis, Characterization, and Physical Properties of Poly(indene-*b*-isobutylene-*b*-indene) Thermoplastic Elastomers. *Macromolecules*, 1993, 26:429-35.

Kim, MS, et al. Synthesis of Poly (ϵ-caprolactone-*b*-isobutylene) Diblock Copolymer and Poly(ϵ-caprolactone-*b*-iosbutylene-*b*-ϵ-caprolactone) Triblock Copolymer. *Polym. Bull.*, 2002, 48(2), 127.

Kitayama, T, et al. PMMA-*block*-polyisobutylene-*block*-PMMA Prepared with α, ω-dilithiated Polyisobutylene and its Characterization. *Polymer Bull.*, 1991, 26:513-20.

Kurian, J, Living Carbocationic Polymerization of p-halostyrenes and Synthesis of Novel Thermoplastic Elastomers. Ph.D. Thesis, The University of Akron., 1991.

Kwon, Y, et al. Synthesis and Characterization of Poly(isobutylene-*b*-pivalolactone) Diblock and Poly(pivalolactone-*b*-isobutylene-*b*-pivalolactone) Triblock Copolymers. *Macromolecules*, 2002, 35:3348.

Ledwith, A, et al. Absolute Reactivity in the Cationic Polymerization of Methyl and Other Alkyl Vinyl Ethers. *Polymer*, 1975, 16(1):31-37.

Li, D, et al. Polyisobutylene-based Thermoplastic Elastomers. 3. Synthesis, Characterization, and Properties of Poly(α-methylstyrene-*b*-isobutylene-*b*-α-methylstyrene) Triblock Copolymers. *Macromolecules*, 1995, 28:4893-98.

Li, D, et al. Living Carbocationic Sequential Block Copolymerization of Isobutylene with α-methylstyrene. *Macromolecules*, 1995, 28:1383-89.

Lubnin, AV, et al. Living Carbocationic Polymerization of Isobutyl Vinyl Ether and the Synthesis of Poly[isobutylene-*b*-(isobutyl vinyl ether)]. *J. Polymer. Sci. Part A: Polym. Chem.*, 1993, 31:2825-34.

Martinez-Castro, N, et al. Polyisobutylene Stars and Polyisobutylene-*block*-Poly(*tert*-Butyl Methacrylate) Block Copolymers by Site Transformation of Thiophene End-Capped Polyisobutylene Chain Ends. *Macromolecules*, 2003, 36:6985-94.

Miyamoto, M, et al. Living Polymerization of Isobutyl Vinyl Ether with the Hydrogen Iodide/Iodine Initiating System. *Macromolecules*, 1984, 17(3):265-68.

Mori, H, et al. Protection and Polymerization of Functional Monomers. 23. Synthesis of a Well-defined Poly(2-hydroxyethyl methacrylate) by Means of Anionic Livng Polymerization of Protected Monomers. *Macromol. Chem. Phys.*, 1994, 195:3213-24.

Ohgi, H, et al. Highly Isotactic Poly(vinyl alcohol). 2. Preparation and Characterization of Isotactic Poly(vinyl alcohol). *Macromolecules*, 1999, 32:2403.

Okamura, S, et al. The Cationic Polymerization of *t*-Butyl Vinyl Ether at Low Temperature and the Conversion into Polyvinyl Alcohol of Poly-*t*-butyl Vinyl Ether. *Makromol. Chem.*, 1962, 53:180-91.

Pasch, H. Liquid Chromatography at the Critical Point of Adsorption—A New Technique for Polymer Characterization. *Macromol. Symp.*, 1996, 110:107-20.

Pasch, H, et al. Chromatographic Investigations of Molecules in the Critical Range of Liquid Chromatography. 4. Analysis of Poly(styrene-*b*-methyl methacrylate). *Polymer*, 1993, 34(19):4100-04.

Pernecker, T, et al. Living Carbocationic Polymerization. 48. Poly(isobutylene-*b*-methyl vinyl ether). *Macromolecules*, 1992, 25:1642-47.

Puskas, JE, et al. Living Carbocationic Polymerization of Resonance-stabilized Monomers. *Prog. Polym. Sci.*, 2000, 25:403-52.

Quirk, RP, et al. Anionic Synthesis of Block and Star-Branched Polymers via 1,1-Diphenylethylene-functionalized Macromonomers. Polymer Preprints, 1996, 37(2): 402-03.

Radke, W, et al. Simulation of GPC-distribution Coefficients of Linear and Star-shaped Molecules in Spherical Pores. 2. Comparison of Simulation and Experiment. *Polymer*, 2003, 44:519-25.

Reed, PJ, et al. The Preparation and Analysis of High Purity Organolithium Initiators. *J. Organomet. Chem.*, 1972, 39:1-10.

Rembaum, A, et al. Decomposition of Ethyllithium in Tetrahydrofuran. J. Polymer Sci., 1962, 56:S17-S19.

Roovers, Jel, et al. Preparation and Characterization of Four-branched Star Polystyrene. *Macromolecules*, 1972, 5:384-88.

Ruth, WG, et al. Silicon-mediated synthesis of new amphiphilic oligomers. *J. Polymer Sci., Part A*, 1997, 35: 163-70.

Ruth, WG, et al. Synthesis of poly(tert-butyldimethylsilyl vinyl ether) bl5ock copolymers using silyl aldol polymerization. *Polymer Preprints*, 1993, 34(2): 584-5.

Satoh, K, et al. Direct Synthesis of Amphiphilic Random and Block Copolymers of *p*-hydroxystyrene and *p*-methoxystyrene via Living Cationic Polymerization with $BF_3OEt_2$/ROH Systems. *Macromolecules*, 2000, 33(16):5830-35.

Satoh, K, et al. Direct Living Cationic Polymerization of p-hydroxystyrene with Boron Trifluoride Etherate in the Presence of Water. *Macromolecules*, 2000, 33(15):5405-10.

Schlaad, H, et al. Kinetic Studies on the Capping Reaction of Living Polyisobutylene with 1,1-diphenylethylene. 1. Effect of Temperature and Comparison to the Model Compound 2-chloro-2,4,4-trimethylpentane. *Macromolecules*, 1998, 31:8058-62.

Shibasaki, Y., et al. Reduction of the Cationic Growing Center of Polyisobutylene by Activated Magnesium. Block Copolymerization of Isobutylene with *tert*-butyl Methacrylate. *Macromol. Chem. Phys.*, 1998, 199(11):2619-23.

Sipos, L, et al. Synthesis of Poly(*L*-lactide)-*block*-polyisobutylene-*block*-poly(*L*-lactide), a New Biodegradable Thermoplastic Elastomer. *Macromol. Rapid Commun.*, 1995, 16(12):935-40.

Storey, RF, et al. Aspects of the Synthesis of Poly(styrene)-*b*-isobutylene-*b*-styrene) Block Copolymers Using Living Carbocationic Polymerization. *Macromolecules*, 1993, 26:6727-33.

Tsunogae, Y, et al. Polyisobutylene-containing Block Polymers by Sequential Monomer Addition. X. Synthesis of Poly(α-methylstyrene-*b*-isobutylene-*b*-α-methylstyrene) Thermoplastic Elastomers. *J. Polym. Sci., Polym. Chem. Ed.* 1994, A32:403-12.

Zhou, Y, et al. Synthesis of poly(isobutylene-b-tert-butyl vinyl ether) and poly(isobutylene-b-tert-butyldimethylsilyl vinyl ether) dublock copolymers. Polymer Preprints, 2003, 44(2): 661-2.

\* cited by examiner

END-CAPPED POLYMER CHAINS AND PRODUCTS THEREOF

STATEMENT OF RELATED APPLICATION

This application claims the benefit of priority to U.S. provisional patent application No. 60/480,121 filed Jun. 20, 2003, which is incorporated herein by reference in its entirety.

FIELD OF THE INVENTION

The present invention relates processes for converting a carbocationically terminated polymer to an anionically terminated polymer, and to products formed using such processes.

BACKGROUND OF THE INVENTION

Living polymerizations provide versatile synthetic routes for the preparation of a wide variety of well-defined polymer structures, such as end-functionalized polymers, star-shaped polymers and/or block copolymers. Because specific living polymerization methods (e.g., anionic and carbocationic living polymerizations) are each applicable only to a limited number of monomers, the combination of different living polymerization techniques should lead to new and unique combinations of blocks in block copolymers. Recent success in the synthesis of functionalized polyisobutylene (PIB) with quantitative functionality, and of block copolymers with high structural integrity, is based on the applications of non-homopolymerizable monomers such as 1,1-diphenylethylene (DPE) in cationic polymerization. Bae, Y. C.; Faust, R. *Macromolecules* 1998, 31, 9379. These processes involve the intermediate capping reaction of living PIB with DPE or its derivatives. The resulting stable and fully ionized carbenium ions have been successfully employed for the quantitative end-functionalization of living PIB with soft nucleophiles such as silyl ketene acetals (see Fodor, Z.; Hadjikyriacou, S.; Li, D.; Faust, R. *Polym. Prepr. (Am. Chem. Soc., Div. Polym. Chem)* 1994, 35(2), 492-493) and the controlled initiation of the second monomers such as p-methyl styrene (see Fodor, Z. Faust., R. J. *Macromol. Sci., Pure Appl. Chem.* 1994, A31 (12), 1985-2000) and isobutyl vinyl ether (see Hadjikyriacou, S. Faust., R. *Macromolecules* 1995, 28, 7893-7900).

Block copolymers of isobutylene (IB) and polar monomers, such as methacrylates, acrylamides, polyethers, or polyesters should combine the high environmental stability of elastomeric, non-polar PIB with the large variety of structures and properties of polar polymers. However, because PIB can only be effectively obtained by carbocationic polymerization, many attempts have been undertaken to transform living cationic PIB chain ends to radical (see Chen, X.; Iván, B.; Kops, J.; Batsberg, W. *Macromol. Rapid Commun.* 1998, 19, 585) or anionic (see Kitayama, T.; Nishiura, T.; Hatada, K. *Polym. Bull.* 1991, 26, 513) ones.

Although many prior attempts were less successful, metalation of DPE end-capped PIB with Na/K alloy or cesium followed by anionic polymerization allowed for the synthesis of PIB-b-PtBMA diblock copolymers, PMMA-b-PIB-b-PMMA triblock copolymers, and (PMMA-b-PIB)₃ starblock copolymers. See Feldthusen, J.; Iván, B.; Müller, A. H. E. *Macromolecules,* 1997, 30, 6989; and Feldthusen, J.; Iván, B.; Müller, A. H. E. *Macromolecules* 1998, 31, 578-585. Metalation with alkali metals, however, is inconvenient and lithiation with alkyllithium (e.g., butyllithium) would be preferable. Unfortunately, lithiation of DPE end-capped PIB by alkyllithium does not proceed quantitatively.

Recently, Faust et al. showed that furan (Fu) functional polyisobutylene (PIB-Fu) can be obtained by the quantitative reaction of living PIB and 2-tributylstannyl furan. See Hadjikyriacou, S.; Faust, R. *Macromolecules* 1999, 32, 6393-6399. Using unsubstituted Fu, however, side reactions in which two living chain ends were coupled to a single Fu were not avoided. Once formed, PIB-Fu chain ends could be lithiated with n-BuLi, however, the polymerization of methacrylates using this macroinitiator was accompanied by side reactions. See Scheunemann, S. G.; Diplomarbeit, Universität Mainz, 1999.

In place of PIB-Fu, the present inventors have discovered that it is also possible to use thiophene (T) functional PIB (PIB-T) in the metalation reaction. An advantage is that unsubstituted T may be used to prepare PIB-T while avoiding the above noted difficulties associated with Fu, since the reactivity of T is about one tenth that of Fu.

Iván et al. reported on attempts to use T as a coupling agent for living PIB, but under the conditions chosen (−80° C., methylcyclohexane/dichloromethane 60/40 v/v, [TiCl₄]/[initiator]/[T]=10/2/1) only 17% of coupling product was formed after 2 h and 36% after approx. 24 h when stirred at room temperature. See Iván, B.; De Jong, F.; WO 9909074 (1999), assigned to Infineum Holdings B. V., Netherlands.

SUMMARY OF THE INVENTION

According to one embodiment of the present invention, a method for converting a carbocationically terminated polymer to an anionically terminated polymer is provided. The method comprises: (a) providing a carbocationically terminated polymer; (b) reacting said carbocationically terminated polymer with a heterocyclic compound of the formula

where —X— is selected from —S— (thiophene), —O— (furan), —NH—(1H-pyrrole) or —NR—, where R is an alkyl or aryl, thereby providing an end-capped polymer; and (c) reacting said end-capped polymer with an organolithium compound to yield an anionically terminated polymer.

In the above scheme, at least 75 wt % of the carbocationically terminated polymer is preferably attached to the heterocyclic compound in a monofunctional (mono-substituted) fashion, more preferably, at least 90 wt %, at least 95 wt %, or even 99 wt % or more of the carbocationically terminated polymer.

In general, the molar ratio of the heterocyclic compound to the carbocationically terminated polymer in the reaction mixture is greater than 1:1, more preferably greater than 3:1, greater than 10:1, greater than 30:1 or even 100:1 or greater. The amount of carbocationically terminated polymer can typically be approximated by the amount of initiator that is supplied at the beginning of a cationic polymerization reaction scheme.

Examples of carbocationically terminated polymers include carbocationically terminated polymers of cationically polymerizable monomers, for instance, olefins such as isobutylene, 2-methylbutene, isoprene, and the like, vinyl aromatics such as styrene, alpha-methyl styrene, para-chlorostyrene, para-methylstyrene and the like, vinyl ethers such as methyl vinyl ether, isobutyl vinyl ether, butyl vinyl ether, N-vinyl carbazole, and the like.

In certain embodiments, the carbocationically terminated polymer is formed at low temperature (e.g., −80 C) in a reaction mixture that comprises: (a) a solvent system appropriate for cationic polymerization, many of which are well known in the art (for example, a mixture of polar and non-polar solvents, such as a mixture of methyl chloride and hexanes), (b) a monomer (e.g., isobutylene or another cationically polymerizable monomer such as those discussed above), (c) an initiator, for example, tert-ester, tert-ether, tert-hydroxyl or tert-halogen containing compounds, and more typically cumyl esters of hydrocarbon acids such as alkyl cumyl ethers, cumyl halides and cumyl hydroxyl compounds, as well as hindered versions of the same, for instance, tert-butyl dicumyl chloride and tert-butyl dicumyl chloride (5-tert-Butyl-1,3-bis(1-chloro-1-methylethyl)benzene) are used in the Examples below; and (d) a coinitiator, typically a Lewis acid such as boron trichloride or titanium tetrachloride. Carbocationically terminated star polymers can be formed by selecting initiators having three or more initiation sites such as tricumyl chloride (1,3,5-tris(1-chloroy-1-methylethyl) benzene).

In addition, an electron pair donor (e.g., dimethyl acetamide, dimethyl sulfoxide or dimethyl phthalate) or a proton-scavenger (e.g., 2,6-di-tert-butylpyridine, 4-methyl-2,6-di-tert-butylpyridine, 1,8-bis(dimethylamino)-naphthalene or diisopropylethyl amine) can be added to the reaction mixture if desired.

Once a carbocationically terminated polymer is provided in an appropriate solvent system such as those discussed above (e.g., living cationic PIB provided in a $CH_3Cl$/n-hexane solvent system), a heterocyclic compound like those described above (e.g., thiophene) is added, and allowed to react with the carbocationically terminated polymer under appropriate reaction conditions (e.g., −78 C) to form an end-capped polymer (e.g., PIB-T).

Where a proton scavenger is used (for example, to scavenge protic impurities and thereby achieve a narrowing of the molecular weight distribution of the carbocationically terminated polymer), the amount of proton scavenger is preferably held to a minimum, thereby avoiding reaction of more than one carbocationically terminated polymer with each heterocyclic compound. Preferably, the molar ratio of proton scavenger to carbocationically terminated polymer (which can be approximated by the initial initiator concentration) is 1:1 or less, for example, 0.75:1 or less, 0.66:1 or less, 0.5:1 or less, 0.25:1 or less, or even 0.1:1 or less.

Moreover, the molar ratio of Lewis acid to carbocationically terminated polymer (or initiator) is typically greater than 10, more typically greater than 20, 30, 40 or more in order to improve reactivity with between the polymer and the heterocyclic compound.

Once formed, the end-capped polymer (e.g., PIB-T) is typically isolated and purified. As indicated above, preferred end-capped polymers are thiophene-terminated polymers of cationically polymerizable monomers. After isolation and purification, the end-capped polymer is lithiated with an organolithium compound, thereby yielding an anionically terminated polymer (or macroinitiator). The organolithium compound is typically an alkyllithium compound, for example, methyllithium, ethyllithium, isopropyllithium, normal-, sec-ondary- and tertiary-butyllithium, benzyllithium, allyl-lithium, and so forth.

Lithiation can be conducted, for example, at low temperatures (e.g., −40° C.) in a reaction mixture that comprises: (a) a solvent system appropriate for lithiation, many of which are well known in the art (for example, a polar solvent such as THF or a non-polar solvent, such as hexane or toluene in the presence of an electron donor, such as N,N,N'N'-tetramethylethylenediamine), (b) the end-capped polymer (e.g., PIB-T) to be lithiated, and (c) the organolithium compound (e.g., an alkyllithium compound such as n-BuLi, s-BuLi or tert-BuLi).

The organolithium compound may be provided in a molar excess relative to the end-capped polymer. For example, the molar ratio of the organolithium compound to the end-capped polymer is beneficially 1.1:1, 1.5:1, 2:1, 4:1, or even greater. Excess organolithium compound can be removed, for example, by increasing the temperature of the same in the presence of a reactive solvent, for example, by increasing the temperature to +30° C. or higher in the presence of THF.

Consistent with the above, preferred anionically terminated polymers are lithiated, thiophene-terminated polymers of cationically polymerizable monomers.

Once formed, the anionically terminated polymer may be subjected to a variety of additional processes. For example, an anionic polymerization step such as a living anionic polymerization step can be performed by combining the anionically terminated polymer with an appropriate anionically polymerizable monomer, for example, a polar monomer. Examples of anionically polymerizable monomers include vinyl aromatic monomers such as styrene, alkyl substituted styrene and divinyl benzene, diphenylethylene, conjugated dienes such as isoprene and butadiene, N,N-disubstituted acrylamides and methacrylamides such as N,N-dimethylacrylamide, alkyl acrylates and methacrylates such as isodecyl methacrylate, glycidyl methacrylate and tert-butyl methacrylate, vinyl unsaturated amides, acrylonitrile, methacrylonitrile, vinyl pyridines, isopropenyl pyridines, other vinyl monomers such as n-alkyl isocyanates, heterocyclic monomers such as ethylene oxide, ε-caprolactone, L,L-lactide, D,D-lactide, D,L-lactide, and their mixtures.

Preferred block copolymers are those comprising (a) one or more polymer blocks formed from cationically polymerizable monomers and (b) one or more blocks of anionically polymerizable monomers. Examples include $X\text{-}(CA)_n$, $X(CC'A)_n$, or $X(CAA')_n$, where C and C' are blocks formed from one or more cationically polymerizable monomer types, where A and A' are blocks formed from one or more anionically polymerizable monomer types, where X is an initiator molecule, where n is a positive whole number (as noted above, initiators can yield multi-armed block polymers), and where the thiophene residue is not shown. More preferred are $X\text{-}(CA)_n$ structures where n=1 and n=2, which are frequently referred to as diblock copolymers and triblock copolymers respectively (this terminology disregards the presence of the initiator, which is trivial, for example, treating C—X—C as a single C block with the triblock therefore denoted as ACA). Where n=3 or more, these structures are commonly referred to as star-shaped block copolymers or star-block copolymers.

As another example, the anionically terminated polymers of the present invention can be reacted with a linking compound. Examples of linking compounds include halogenated silanes, $SiCl_nR_{4-n}$, or carbosilanes, such as $[Cl_nSiR_{3-n}]_{4-m}CR'_m$, or more highly branched structures, where n and m are integers between 1 and 4, R and R' can independently be either hydrogen or an alkyl group, and where the thiophene residue is not shown. Other linking agents include aromatic compounds like benzene or naphthalene carrying two or more chloromethyl or bromomethyl or chlorodialkylsilyl groups.

For instance, the anionically terminated polymer can be reacted with $SiCl_nR_{4-n}$ to form linear and star polymers (e.g., up to four branches). This process is commonly carried out at a temperature that is higher than that of prior steps (e.g., cationic polymerization, end-capping and lithiation), for example, at room temperature (25° C.), or even greater (e.g., 40° C.).

The polymer products of the present invention may be used, for example, as new thermoplastic elastomers, dispersing agents, compatibilizers, emulsifiers, nonionic surfactants or biomaterials.

The above and other embodiments, aspects and examples of the present invention will become readily apparent to those of ordinary skill in the art in view of the disclosure herein.

DETAILED DESCRIPTION

Figure 1:
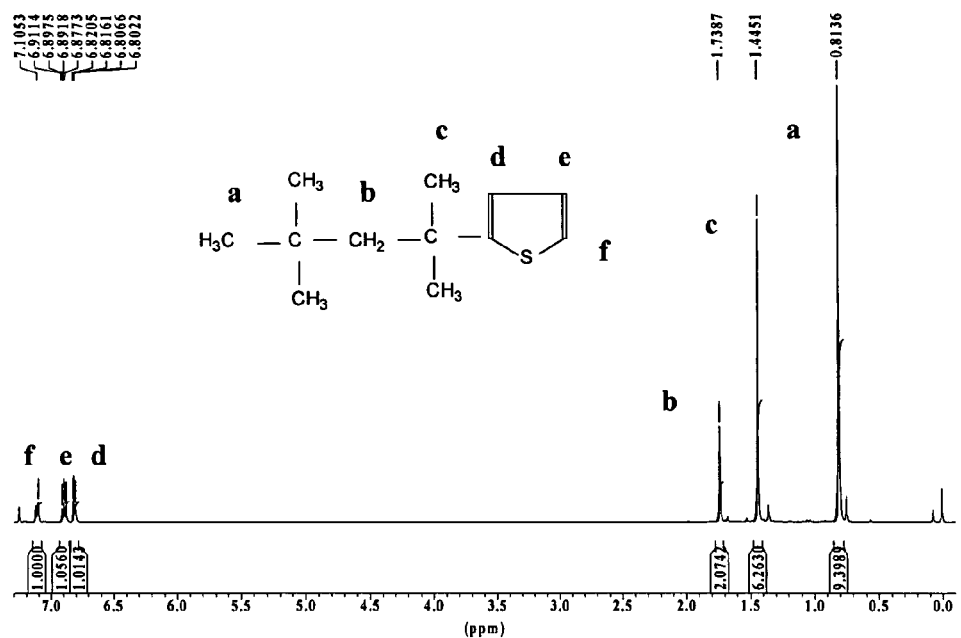
FIG. 1 is an $^1$H NMR spectrum corresponding to 2-(1,1,3,3-tetramethylbutyl)thiophene.

The present invention now will be described more fully hereinafter with reference to certain specific embodiments. This invention may, however, be embodied in different forms and should not be construed as limited to the embodiments set forth herein.

According to one aspect of the present invention, a new route to an anionically terminated polymer (also referred to herein as a "macroinitiator" based on its ability to initiate further reactions), for example, an anionic PIB macroinitiator, is provided by reacting a carbocationically terminated polymer (e.g., living cationic PIB) with a heterocyclic compound (e.g., T) to form an end-capped compound (e.g., PIB-T) and subsequent lithiation with an alkyllithium compound (e.g., n-BuLi) to provide, in this instance, the macrocarbanion, PIB-T$^-$,Li$^+$.

In some embodiments, these macroinitiators are used to synthesize star polymers (e.g., PIB stars) by reacting the macroinitiators (e.g., PIB-T$^-$,Li$^+$) with coupling molecules such as chlorosilanes (which have been used previously to couple living polybutadiene anionic chain ends to form star polymers; see Roovers, J. E. L. and S. Bywater (1972). "*Macromolecules* 1972, 5, 385).

In other embodiments, these anionic macroinitiators (e.g., PIB-T$^-$,Li$^+$) are used to efficiently initiate the polymerization of anionically polymerizable monomers (e.g., tert-butyl methacrylate, tBMA) to produce block copolymers in nearly quantitative yield. In this way, the present invention provides new synthetic routes for block copolymers (e.g., PIB-poly (methacrylate)), which combines living carbocationic and anionic polymerizations. Subsequent to anionic polymerization and before anion quenching, the resulting block copolymers can be reacted, if desired, with coupling molecules, such as (di- or trichloromethyl)benzene, to form star copolymers (e.g., PIB-tBMA stars).

In accordance with still other, more specific, embodiments of the invention: (a) rapid and quantitative monoaddition of thiophene to living PIB chains is observed using TiCl$_4$ as Lewis acid in n-hexane/CH$_2$Cl$_2$ 60/40 v/v at −78° C. leading to the formation of 2-polyisobutylenyl-thiophene (PIB-T); (b) PIB-T is quantitatively metalated with n-butyllithium in THF at −40° C.; (c) The resulting stable macrocarbanion (PIB-T$^-$,Li$^+$) is used to initiate living anionic polymerization of tert-butyl methacrylate (tBMA) yielding PIB-b-PtBMA block copolymers with high blocking efficiency; and (d) PIB stars are prepared via the coupling reaction of the stable macrocarbanion (PIB-T$^-$,Li$^+$) with SiCl$_4$ as a coupling agent.

Experimental

Materials. 2,6-Di-tert-butylpyridine (DtBP, Aldrich, 97%) was purified by distillation from CaH$_2$. Isobutylene (IB, BASF) was passed through in-line gas purifier columns packed with CaSO$_4$ and no. 13 molecular sieves and condensed at −15° C. prior to polymerization. CH$_3$Cl was passed through in-line gas purifier columns packed with BaO/Drierite and condensed at −80° C. prior to polymerization. CH$_2$Cl$_2$ was purified by washing it with 10% aqueous NaOH and then with distilled water until neutral and dried over anhydrous MgSO$_4$ overnight. It was refluxed for 24 h and distilled from CaH$_2$, just before use. N-hexane was rendered olefin free by refluxing it over concentrated sulfuric acid for 48 h. It was washed with 10% aqueous NaOH and then with deionized water until neutral and stored over MgSO$_4$ for 24 h. It was then refluxed over CaH$_2$ overnight and distilled. Methylcyclohexane (MeCHX, Aldrich, 99%) and titanium (IV) chloride (TiCl$_4$, Aldrich, 99.9%) was used as received. Thiophene (T, Aldrich, 99%) was distilled the day before use and stored at 4° C. 2-Chloro-2,4,4-trimethylpentane (TMPCl) was prepared by hydrochlorination of 2,4,4-trimethyl-1-pentene (Fluka, 98%) with hydrogen chloride gas in dry dichloromethane at 0° C. See Kaszas, G.; Gyor, M.; Kennedy, J. P.; Tüdös, F. *J. Macromol. Sci., Chem* 1983, A18, 1367-1382. The product was dried over CaCl$_2$ and distilled under reduced pressure before use. 5-tert-Butyl-1,3-bis(1-chloro-1-methylethyl)benzene (tBuDiCumCl) was synthesized following the procedure reported elsewhere. See Gyor, M. Wang., H. C.; Faust, R. *J. Macromol. Sci., Pure Appl. Chem* 1992, A29, 639. Chlorotrimethylsilane (Me$_3$SiCl) and tetrachlorosilane (SiCl$_4$) (both Merck, 98%) were stirred over freshly ground CaH$_2$ for at least 24 h, followed by distillation prior to use. Triethylaluminum (AlEt$_3$, Aldrich, 1.0 M in hexane) was used as received. tert-Butyl methacrylate (tBMA, BASF) was pre-dried with CaH$_2$, carefully degassed by freeze-thaw cycles in high vacuum, mixed with AlEt$_3$ solution until a yellow color persisted and then condensed into ampoules. THF (Merck p.a.) was purified first by distillation under nitrogen from CaH$_2$ and then by refluxing over potassium. n-Butyllithium (n-BuLi, 1.6 M in hexane) was purchased from Aldrich and its concentration was titrated by a standard method. See Reed, P. J.; Urwin, J. R. *J. Organometal. Chem.* 1972, 39, 1-10.

Characterizations. $^1$H-NMR spectroscopy was carried out on a Bruker AC-250 MHz spectrometer at 25° C. in CDCl$_3$ using TMS as an internal standard. Gas Chromatography (GC) was carried out on a Fisons GC 8000 model equipped with flame ionization detection (FID). A DB1 methylpolysiloxane column (30 m×0.53 mm I.D.) was used with hydrogen as carrier gas. Size Exclusion Chromatography (SEC) was performed using THF as eluent at a flow rate of 1 mL/min equipped with four 30 cm PSS SDV gel columns (particle size 5 μm, porosity $10^2$-$10^5$ Å) heated to 40° C. Calibration was based on PIB and PtBMA standards (PSS, Mainz). Molecular weights of PIB stars were determined by universal calibration using three 30 cm PSS SDV gel columns of 5 μm with $10^3$, $10^5$, and $10^6$ Å porosity; detectors: Shodex RI-71 refractive index detector; Jasco Uvidec-100-III UV detector (λ=254 nm); Viscotek viscosity detector H 502B. Liquid adsorption chromatography under critical conditions (LACCC) was conducted on a TSP HPLC system at a flow rate of 0.5 mL/min. An Evaporative Light Scattering Detector (ELSD, PL-EMD 960) operating at 50° C. with a gas flow rate of 3.5 L/min was used for mass detection. 10μL of ca. 0.5 wt % polymer solutions were injected. All measurements were carried out at a constant column temperature of 35° C. Two Reversed Phase columns (YMC, 250×4 mm) with 5 μm average particle size, 100 Å and 300 Å pore diameter were used. The critical solvent composition for PIB is THF/Methanol 80.5/19.5 (wt/wt). Premixing of the mobile phase by weight is necessary for a constant and exact composition.

EXAMPLE 1

End-Capping of PIB with Thiophene

Model experiments with TMPCl. Orienting model experiments were carried out with TMPCl, which mimics the end group structure of tert-chloro-terminated PIB and the living chain ends upon addition of TiCl$_4$ as a Lewis acid. These reactions were carried out in order to investigate the end-capping with T. The $^1$H NMR spectrum of 2-(1,1,3,3-tetrametylbutyl) thiophene is shown along with the assignments in FIG. 1. The resonances identified in the aromatic range at 6.82 (1H on Cd), 6.89 (1H on Ce), 7.10 (1H on Cf) confirmed one thiophene ring substituted by the TMP residue. In the aliphatic region the $^1$H NMR spectral assignments are as follows: 0.81 ppm (s, 9H, CH$_3$), 1.44 ppm (s, 6H, CH$_3$), 1.73 ppm (s, 2H, CH$_2$), 6.82 ppm (m, 1H, thiophene CH), 6.89 ppm (m, 1H, thiophene CH), 7.10 ppm (m, 1H, thiophene CH).

Synthesis of Thiophene-Ended PIB (PIB-T). It was of interest to determine whether the end-functionalization results obtained with the model compounds could be applied to the synthesis of thiophene-ended PIB.

The synthesis of PIB-T was carried out under a dry nitrogen atmosphere in a glovebox. Living polymerizations of IB with TMPCl as initiator were carried out according to the following representative procedure. Into a 1 L three-necked flask equipped with a septum, a magnetic stirrer, and a nitrogen inlet were added of 240 mL of CH$_3$Cl, 404 mL of n-hexane, and 0.355 mL (0.302 g, 1.58 mmol) of DtBP and then the mixture was cooled to −78° C. 15 mL (10.57 g, 0.188 mol) of IB was charged to the reactor by a syringe. After 10 min of stirring, 0.6 mL (0.525 g, 3.53 mmol) of TMPCl was transferred to the reactor by a transfer needle. After 5 min of stirring, 1.5 mL (2.68 g, 0.014 mol) of TiCl$_4$ was transferred to the reactor by a transfer needle. One hour later 28.3 mL (29.74 g, 0.353 mol) of T was added to the polymerization system; the color of the solution changed from slightly yellow to red. T was allowed to react with the living chain ends for 60 min. Finally, the reaction was quenched by addition of 30 mL (23.55 g, 0.75 mol) of prechilled methanol. The crude product was dissolved in n-hexane and the mixture was filtered in order to remove inorganic precipitates. Then, the hexanes phase was isolated and washed once with NH$_3$(aq) and subsequently with water until neutral. The organic layer was separated and dried over MgSO$_4$ for about 2 h. Subsequently, the solution was filtered, and the solvent was removed on a rotary evaporator. Then, the polymer was dissolved in a small amount of n-hexane and precipitated two or three times into acetone in order to remove excess T.

Figure 2:
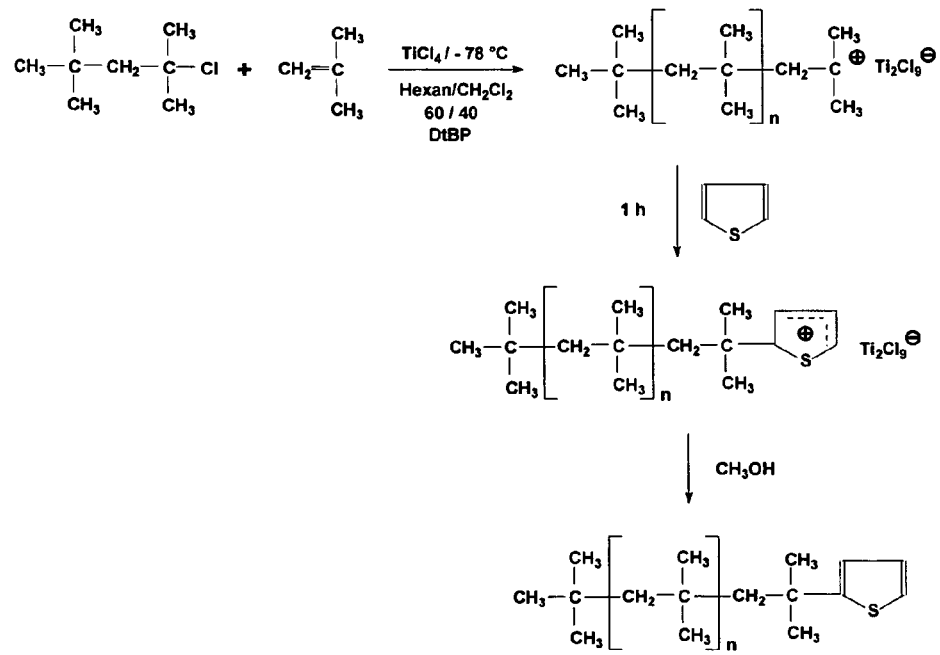
FIG. 2 is a synthesis scheme illustrating the capping of a living PIB carbocation with Thiophene.
Figure 3:
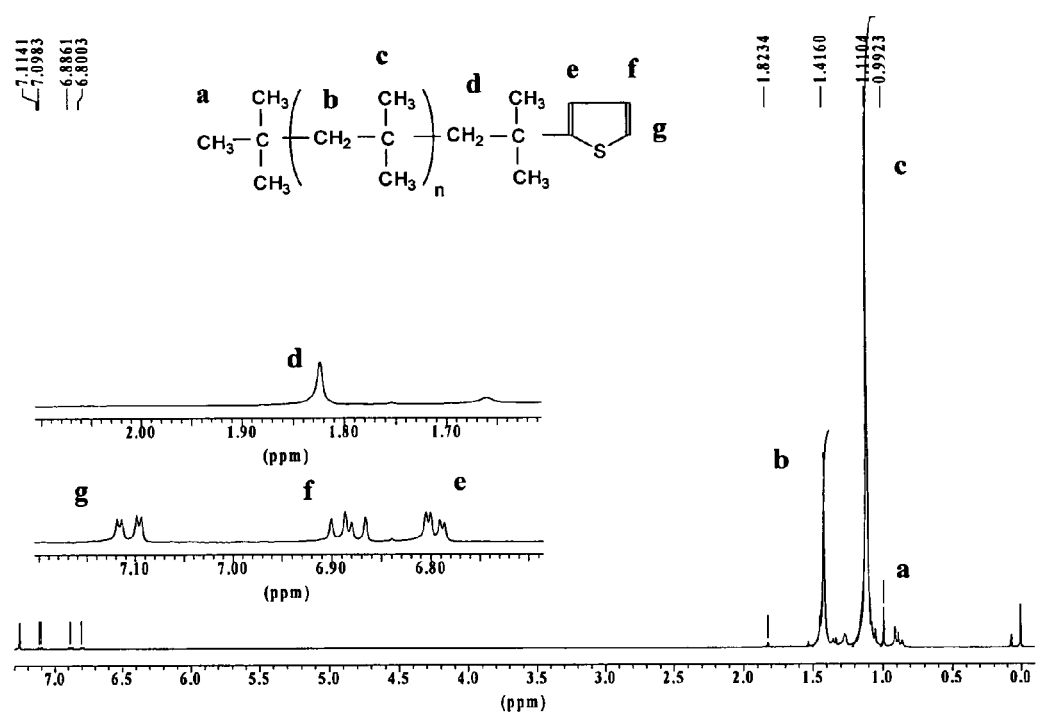
FIG. 3 is an $^1$H NMR spectrum corresponding to thiophene-functionalized PIB.

The proposed scheme for the above is illustrated in FIG. 2. FIG. 3 shows the $^1$H NMR spectrum of the resulting polymer. This spectrum indicates quantitative end-functionalization and formation of 2-polyisobutylenyl-thiophene (PIB-T) by this process. This confirms results obtained with the corresponding model compound. Quantitative addition was indicated by the disappearance of the peaks at 1.9 ppm (PIB-CH$_2$—C(CH$_3$)$_2$—Cl) and 1.69 ppm (PIB-CH$_2$—C(CH$_3$)$_2$—Cl). A new set of peaks at 1.82, 6.80, 6.88, and 7.09 ppm appeared due to the presence of the thiophene ring at the chain end. Undesirable coupling products (double addition of PIB at thiophene[11]) or other side reactions, e.g. as determined with furan,[9,16] were not detectable under the conditions used. See Iván, B.; De Jong, F.; WO 9909074 (1999), to: Infineum Holdings B. V., Netherlands; Hadjikyriacou, S.; Faust, R. *Macromolecules* 1999, 32, 6393-6399; Hadjikyriacou, S.; Faust, R. *Macromolecules* 2000, 33, 730-733.

EXAMPLE 2

Synthesis of α,ω-Dithiophene-Ended PIB (T-PIB-T)

Polymerizations were initiated with the difunctional initiator 5-tert-butyl-1,3-bis(1-chloro-1-methylethyl)benzene (tBuDiCumCl). After completion of IB polymerization, equal volumes of the polymer solution in the reactor were delivered into culture tubes. To each culture tube additional amount of TiCl$_4$ or DtBP was charged to vary the ratio of [TiCl$_4$] to [tBuDiCumCl] or [DtBP] to [tBuDiCumCl] in the polymer solution. The functionalization of PIB was conducted by two different methods: addition of T/CH$_3$Cl solution into the polymer solution (T to polymer) and addition of the polymer solution into T/CH$_3$Cl solution (polymer to T). 200 equiv. of T was used for the functionalization of PIB. After 1 h, the reaction mixture was quenched with prechilled methanol and poured into methanol. The polymer was purified by the precipitation of the polymer solution into methanol, followed by drying in vacuum.

Figure 4:
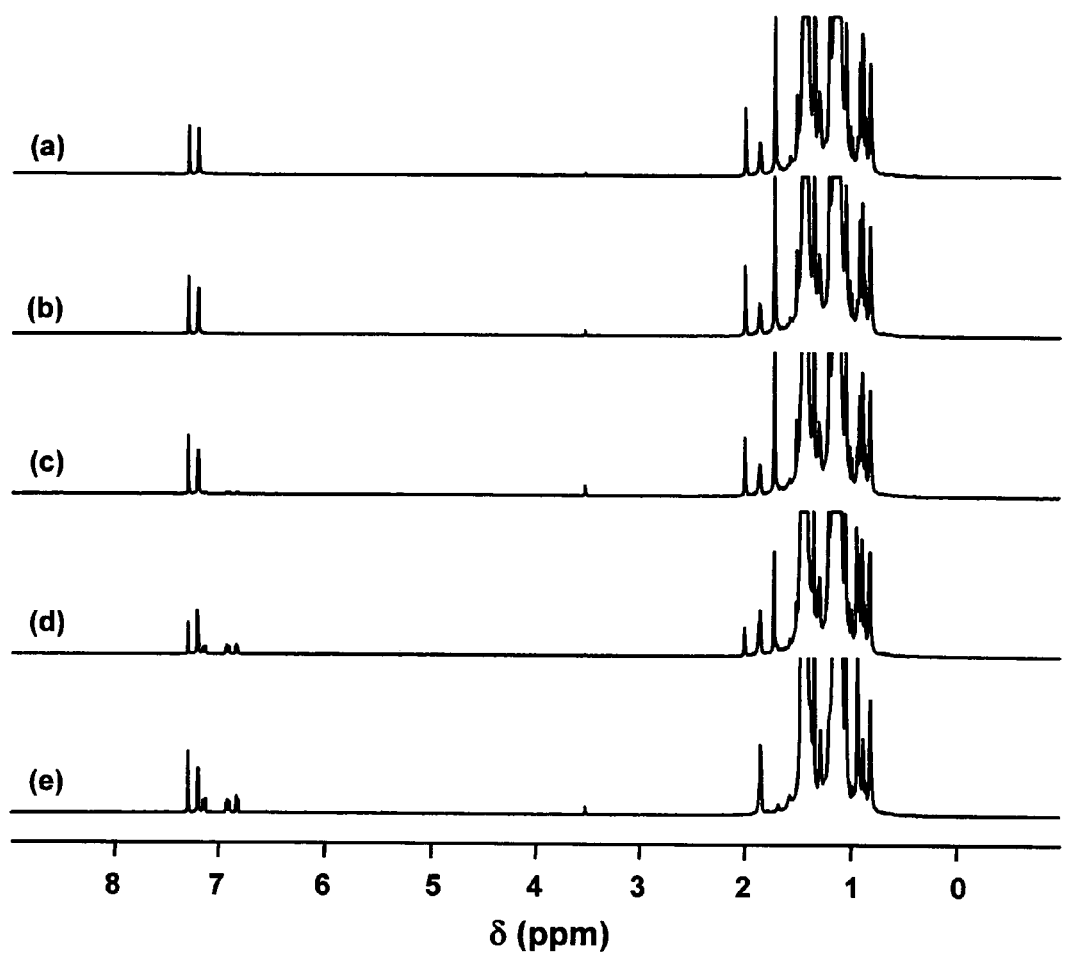
FIG. 4 illustrates $^1$H NMR spectra of (a) PIB and of PIB-T prepared by the addition of Thiophene (T) to polymer where the [TiCl$_4$]/[tBuDiCumCl] ratios are as follows: (b) 1; (c) 2; (d) 4; (e) 8.

Effect of the ratio of [TiCl$_4$] to [tBuDiCumCl]. Living PIB was prepared by the polymerization of IB with the tBuDiCumCl ($1.1 \times 10^{-2}$ M)/TiCl$_4$ ($1.1 \times 10^{-2}$ M) initiator system in the presence of DtBP ($3.0 \times 10^{-3}$ M) as a proton trap in MeCHX/CH$_3$Cl at −80° C. After polymerization of IB, the polymer solution was delivered to culture tubes to which additional amount of TiCl$_4$ were charged so that the ratios of [TiCl$_4$] to [tBuDiCumCl] in the polymer solution were varied from 1 to 8. T end-functionalization of PIB was conducted by using the methods as described above. FIG. 4 shows the $^1$H NMR spectra of PIB and PIB-T. As the [TiCl$_4$]/[tBuDi-CumCl] ratio increased, peaks at 2.0 ppm and 1.7 ppm assigned to methylene and methyl protons at the chain ends of PIB decreased and peak at 1.85 ppm assigned to methylene protons at the chain ends of PIB-T as well as methylene protons adjacent to initiator moiety increased. From the $^1$H NMR spectra, the functionalities of PIBs were calculated as presented in Table 1. The functionality of PIB increased with [TiCl$_4$]/[tBuDiCumCl] and 100% T-PIB-T could be obtained in 1 h at [TiCl$_4$]/[tBuDiCumCl]=8. It is noteworthy that the addition method of T did not affect the functionalization of PIB. The $M_n$ and $M_w/M_n$ of starting PIB and the product was independent of the ratio [TiCl$_4$]/[tBuDiCumCl], indicating the absence of coupling reactions.

TABLE 1

Molecular weights and thiophene funtionalities of PIBs[a]

| Addition method | [TiCl$_4$]/ [tBuDiCumCl] | 10$^{-3}$ M$_n$(g/mol) | M$_w$/M$_n$ | Functionality (%) |
|---|---|---|---|---|
| T to polymer | 1 | 7.1 | 1.31 | 0 |
|  | 2 | 7.1 | 1.35 | 12 |
|  | 4 | 7.2 | 1.33 | 50 |
|  | 8 | 7.5 | 1.36 | 100 |
| Polymer to T | 1 | 6.9 | 1.35 | 0 |
|  | 2 | 7.0 | 1.33 | 14 |
|  | 4 | 7.3 | 1.33 | 50 |
|  | 8 | 7.4 | 1.36 | 100 |

[a]PIB precursor: $M_n$ = 6,900 g/mol; $M_w/M_n$ = 1.34. [tBuDiCumCl] = 1.1 × 10$^{-2}$ M, [DtBP] = 3.0 × 10$^{-3}$ M, [IB] = 1.1 M While T-PIB-T of relatively low $M_n$ are prepared, as described above, using initiator concentrations in the range of 10$^{-2}$ M, the preparation of high $M_n$ T-PIB-T requires lower initiator concentrations in the range of 10$^{-3}$ M. To investigate the functionalization reaction of living with T under these conditions, living PIB was prepared by using the following concentrations: [tBuDiCumCl]=2.7×10$^{-3}$ M; [TiCl$^4$]=2.2×10$^{-2}$ M; [DtBP]=3.0×10$^{-3}$ M. The [TiCl$_4$]/[tBuDiCumCl] ratios were varied from 8 to 32. Table 2 shows that when [TiCl$_4$]/[tBuDiCumCl]≧24, the functionality of PIB was 100% independent of the addition method of T. While the $M_n$ and $M_w/M_n$ of functionalized PIB did not change with [TiCl$_4$]/[tBuDiCumCl], 4~5 mol % of di-substituted thiophene (PIB-T-PIB) was observed in the $^1$H NMR spectra at [TiCl$_4$]/[tBuDiCumCl]≧16.

TABLE 2

Molecular weights and thiophene functionalities of PIBs[a]

| Addition method | [TiCl$_4$]/ [tBuDiCumCl] | 10$^{-3}$ M$_n$ (g/mol) | M$_w$/M$_n$ | Functionality (%) |
|---|---|---|---|---|
| T to polymer | 8 | 7.3 | 1.10 | 36 |
|  | 16 | 7.4 | 1.11 | 85 |
|  | 24 | 7.6 | 1.12 | 100 |
|  | 32 | 7.4 | 1.13 | 100 |
| Polymer to T | 8 | 7.4 | 1.11 | 67 |
|  | 16 | 7.5 | 1.11 | 100 |
|  | 24 | 7.4 | 1.12 | 100 |
|  | 32 | 7.6 | 1.12 | 100 |

[a]PIB precursor: $M_n$ = 7,300 g/mol; $M_w/M_n$ = 1.11; [tBuDiCumCl] = 2.7 × 10$^{-3}$ M, [DtBP] = 3.0 × 10$^{-3}$ M, [IB] = 0.27 M.

Figure 5:
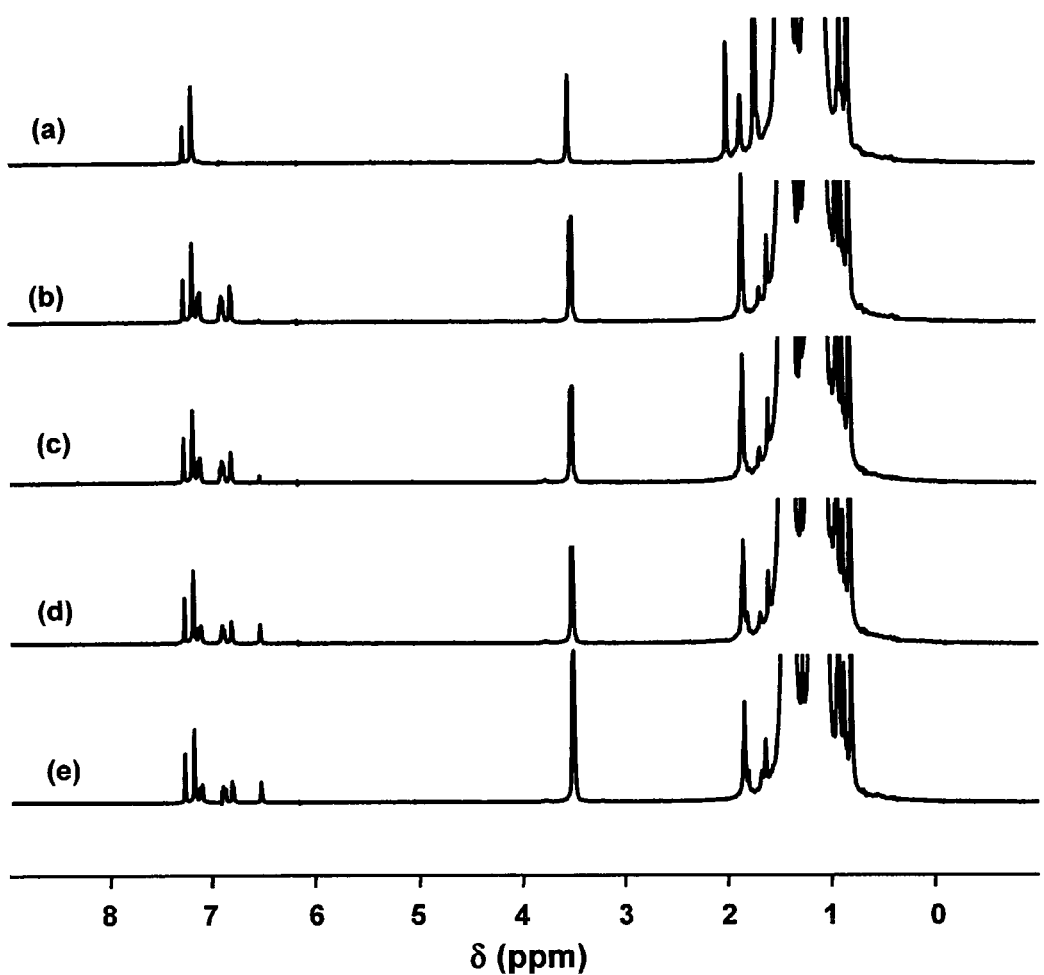
FIG. 5 illustrates $^1$H NMR spectra of (a) PIB and of PIB-T prepared by the addition of Thiophene (T) to polymer where the [DtBP]/[tBuDiCumCl] ratios are as follows: (b) 0; (c) 1; (d) 2; (e) 3.

Effect of DtBP. Since coupling involves a reaction between living PIB and PIB-T, the first step is hypothesized to involve proton elimination from the PIB-T cation, formed upon addition of T to living PIB. To study the role of DtBP, living PIB was prepared without DtBP with [tBuDiCumCl]=1.0×10$^{-3}$ M and [TiCl$_4$]=3.6×10$^{-2}$ M. The obtained PIB precursor exhibited broad molecular weight distribution ($M_w/M_n$=1.67). DtBP was then added to the polymer solution for the functionalization to vary the [DtBP]/[tBuDiCumCl] ratios from 0 to 3. FIG. 5 shows the $^1$H NMR spectra of PIB precursor and functionalized PIBs. As the [DtBP]/[tBuDiCumCl] ratio increased, the peak at 6.65 ppm assigned to protons at di-substituted T increased and peaks at 6.70~7.15 ppm assigned to protons at mono-substituted T decreased. The functionalities of all samples were calculated to be 100% irrespective of the ratio of [DtBP] to [tBuDiCumCl]. However, the mol % of di-substituted T moiety from the coupling reaction of PIB cation and T increased with [DtBP]/[tBuDiCumCl] (Table 3), resulting in the increase of $M_n$ and $M_w/M_n$ of functionalized PIB. From these results, it is evident that DtBP plays a major role in the coupling reaction.

TABLE 3

Molecular weights and fraction of di-substituted T in PIBs[a]

| Addition method | [DtBP]/ [tBuDiCumCl] | 10$^{-3}$ M$_n$ (g/mol) | M$_w$/M$_n$ | PIB-T-PIB (mol %) |
|---|---|---|---|---|
| T to polymer | 0 | 10.1 | 1.68 | 2 |
|  | 1 | 10.3 | 1.66 | 8 |
|  | 2 | 11.4 | 1.95 | 21 |
|  | 3 | 11.2 | 1.94 | 22 |
| Polymer to T | 0 | 9.9 | 1.69 | 2 |
|  | 1 | 10.4 | 1.70 | 9 |
|  | 2 | 11.4 | 1.93 | 22 |
|  | 3 | 11.3 | 1.98 | 22 |

[a]PIB precursor: $M_n$ = 9,900 g/mol; $M_w/M_n$ = 1.67; [tBuDiCumCl] = 1.0 × 10$^{-3}$ M, [TiCl$_4$]/[tBuDiCumCl] = 36, [IB] = 0.15 M; thiophene functionality = 100%

Figure 6:
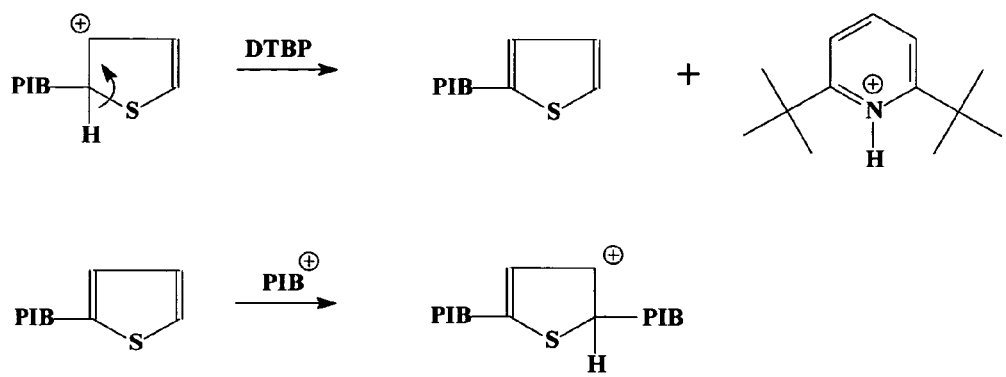
FIG. 6 is a schematic diagram illustrating a proposed mechanism for the coupling reaction of PIB cation with PIB-T.

Proposed Mechanism of Coupling. The results suggest that the PIB-T cation undergoes deprotonation generating PIB-T in situ (FIG. 6). Whether proton elimination is biomolecular, induced by DtPB, or unimolecular and the role of DtBP is only to capture the eliminated proton is not known at present. It is clear, however, that successful preparation of PIB-T is not directly related to the $M_n$. Low $M_n$ PIB-T was prepared without coupled products because high initiator concentration (~10$^{-2}$ M) relative to that of DtBP (~10$^{-3}$ M) was used. According to this finding, DtBP is preferably used in a concentration similar to the concentration of adventitious protic impurities (~1.0×10$^{-3}$ M) and excess of DtBP is typically avoided especially at low initiator concentrations. Accordingly, high $M_n$ PIB-T was prepared by following conditions: [IB]=1.5 M, [tBuDiCumCl]=1.5×10$^{-3}$ M; [DtBP]=1.0×10$^{-3}$ M; [TiCl$_4$]=3.6×10$^{-2}$ M. $M_n$ and $M_w/M_n$ of PIB-T prepared from the reaction of living PIB with T ($M_n$=52,000 g/mol) and those of PIB precursor ($M_n$=50,100 g/mol) are virtually identical. $^1$H NMR spectroscopy of the products confirmed the quantitative functionalization and the absence of coupled product.

EXAMPLE 3

Lithiation of PIB-T

Figure 7:
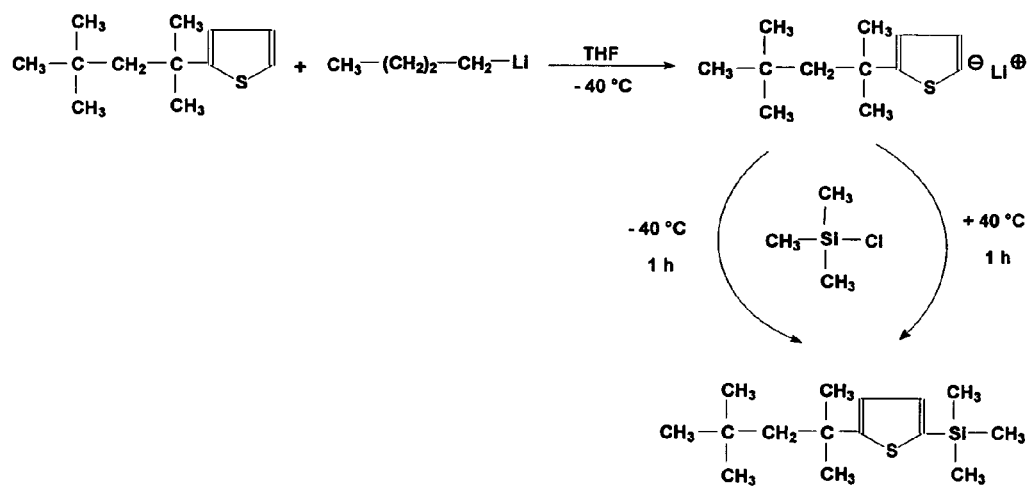
FIG. 7 is a schematic diagram illustrating the lithiation of TMP-T and subsequent reaction with Me$_3$SiCl.

Lithiation of the Model Compound 2-(1,1,3,3-tetrametylbutyl)thiophene (TMP-T). Orienting model experiments were carried out with TMP-T which mimics the end group structure of PIB-T. These reactions were carried out in order to optimize the lithiation of PIB-T and to predict the stability of the anionic chain ends, PIB-T$^-$,Li$^+$, at elevated temperature. One consequence of incomplete lithiation is the presence of unreacted precursor together with the desired block copolymer. Moreover, unreacted n-BuLi can separately initiate anionic polymerization (e.g., polymerization of tBMA) or it can attack ester groups by a nucleophilic substitution. See Hsieh, H. L.; Quirk, R. P. *Anionic Polymerization. Principles and Practical Applications*; M. Dekker: New York, 1996. The easiest way to remove excess n-BuLi is to heat the THF solution, since n-BuLi reacts with THF at elevated temperature, forming ethylene and alkoxides. See Jung, M. E. Blum., R. B. *Tetrahedron Lett.* 1977, 43, 3791-3794. Thus, an excess of n-BuLi can be used for the lithiation, and then it can be destroyed by warming. This method can only be used if the formed anion (PIB-T$^-$,Li$^+$) is stable under these conditions. Some organolithium compounds are known to react with THF and other ethers (see Rembaum, A. Siao, S. P.; Indictor, N. *J. Polym. Sci.* 1962, 56 S17, 1962) but no information exists on the thermal stability of the anion PIB-T$^-$,Li$^+$. Thus, a model reaction was carried out using TMP-T. This reaction is shown in FIG. 7.

Synthesis of 2-(1,1,3,3-tetrametylbutyl)thiophene (TMP-T). Model reactions with TMPCl were carried out under identical conditions to living cationic polymerizations of IB at −78° C. In a 500 mL three-necked flask equipped with a septum, a magnetic stirrer, and a nitrogen inlet were added 16 mL of $CH_2Cl_2$, 20 mL of n-hexane, and 0.07 mL (0.059 g, 0.312 mmol) of DtBP and then the mixture was cooled to −78C. After 10 min of stirring 5.07 mL (4.43 g, 29 mmol) of TMPCl was transferred to the reactor by a transfer needle. After 5 min of stirring, 6.57 mL (11.38 g, 60 mmol) of $TiCl_4$ was transferred to the reactor by a transfer needle. One hour later 2.6 mL (2.73 g, 32 mmol) of T in a solution of 6 mL of n-hexane and 4 mL of $CH_2Cl_2$ was added to the system. T was allowed to react with the living chain ends for 60 min. The reaction was quenched by addition of 20 mL (15.7 g, 0.51 mol) of prechilled methanol. Finally, the solvent was removed on a rotary evaporator and the product (TMP-T) was dried and distilled under reduced pressure before use.

Lithiation of TMP-T and reaction with $Me_3SiCl$. Reaction of lithiated TMP-T with $Me_3SiCl$ was carried out under identical conditions to living anionic polymerizations of tBMA. In a 1 L stirred glass reactor were added 400 mL of THF and 1.75 g (8.93 mmol) of TMP-T, and then the mixture was cooled to −40° C. A sample was taken to determine the exact concentration of TMP-T from gas chromatography (GC) and NMR spectroscopy (see FIG. 8).

After 10 min of stirring, 7.25 mL (11.6 mmol) of n-BuLi was transferred to the reactor by a transfer needle. The excess n-BuLi was allowed to react with TMP-T for 60 min to form the anion (PIB-T$^-$,Li$^+$). The system was warmed to +40° C. and stirred for 1 h in order to destroy the excess of n-BuLi, followed by addition of 1.46 mL (1.26 g, 11.6 mmol) of $Me_3SiCl$. Finally, the solvent was removed on a rotary evaporator and the product (TMP-T-SiMe$_3$) was dried and distilled under reduced pressure.

Figure 8:
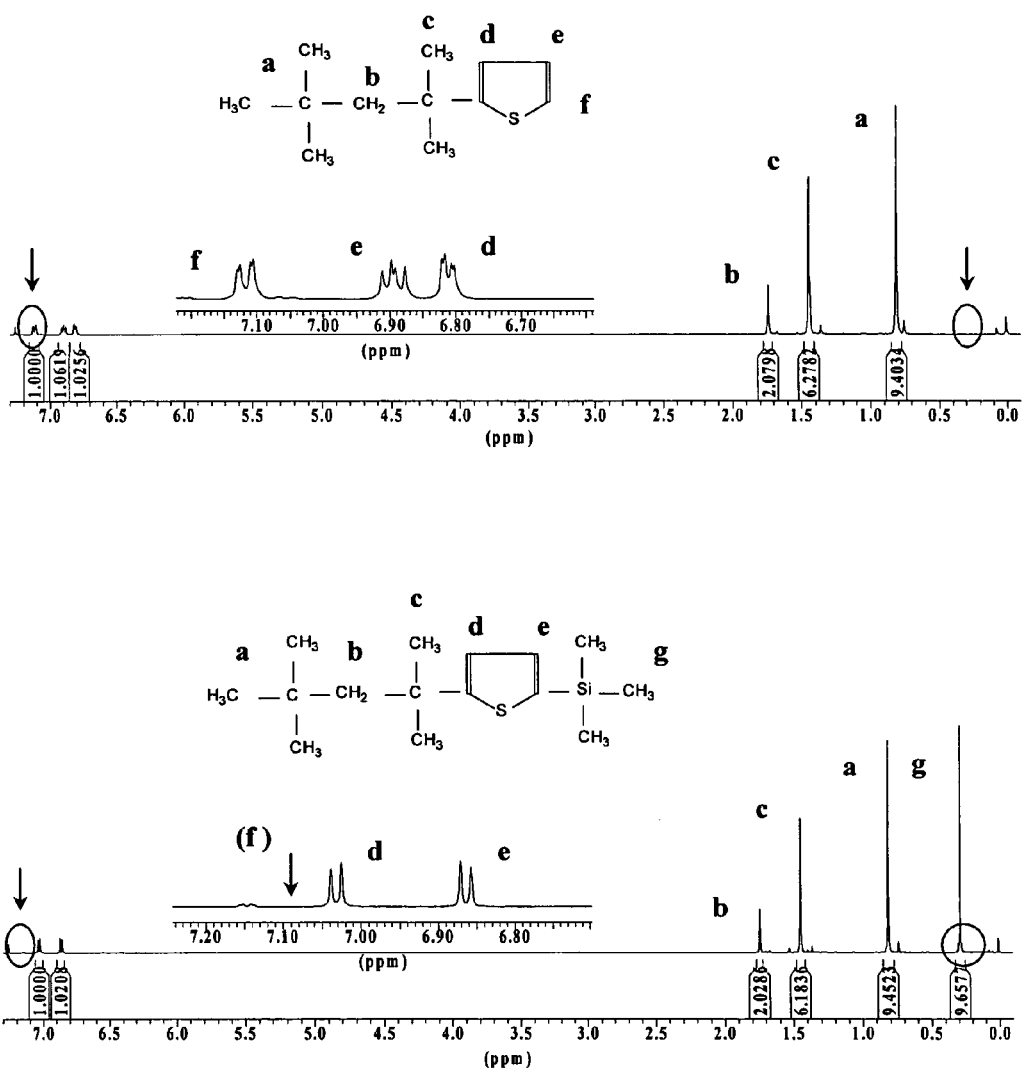
FIG. 8 illustrates $^1$H NMR spectra of TMP-T before and after quenching with Me$_3$SiCl at +40° C.
Figure 9:
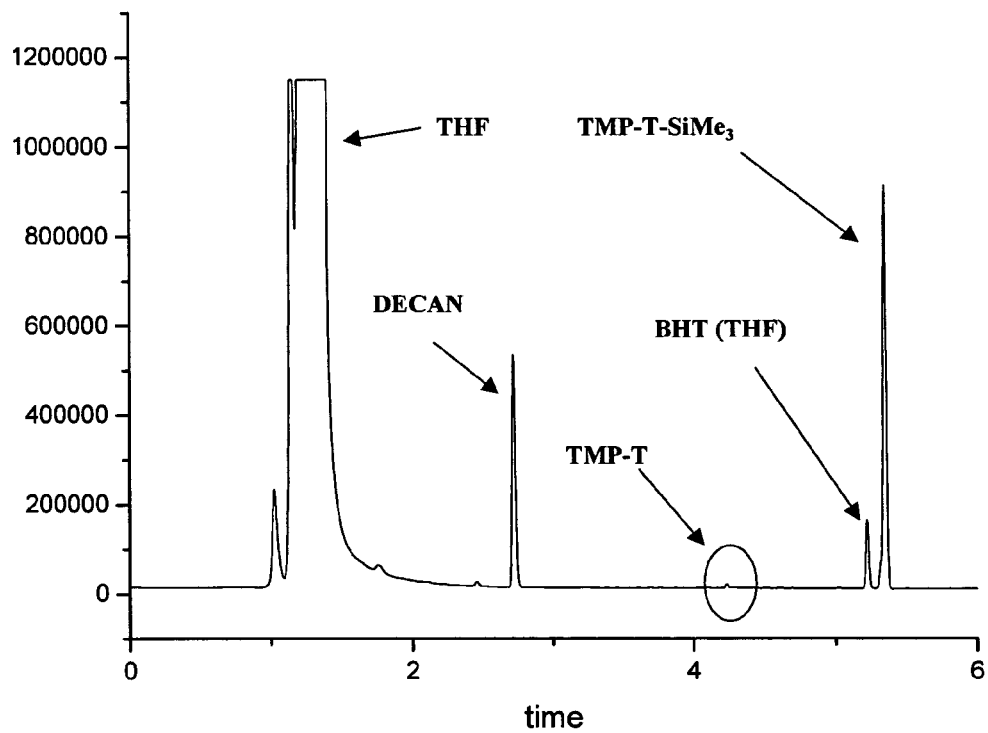
FIG. 9 is a gas chromatogram of TMP-T after quenching with Me$_3$SiCl at +40° C.

The reaction products were characterized by GC and NMR spectroscopy. FIG. 8 shows the $^1H$ NMR spectrum of the resulting product. This spectrum indicates quantitative formation of 2-(trimethylsilyl)-5-(1,1,3,3-tetramethylbutyl)thiophene. Quantitative addition was indicated by the disappearance of the peak at 7.10 ppm. A new peak at 0.29 ppm appeared due to the presence of the trimethylsilyl group. The conversion of this reaction was determined by GC (FIG. 9). The GC characterization was carried out using decane as an internal standard. The sample, obtained after quenching with $Me_3SiCl$ at +40° C. showed high yields (>98.9%) in the formation of 2-(trimethylsilyl)-5-(1,1,3,3-tetramethylbutyl)thiophene. This means that the anion formed during the lithiation (TMP-T$^-$,Li$^+$) is stable for an hour even after the warming of the reaction mixture to 40° C. Thus the results of the model experiments indicated that the lithiation of the precursor (PIB-T) can be carried out using an excess of n-BuLi and then the excess can be destroyed by warming without affecting the stability of the formed anion (PIB-T$^-$,Li$^+$).

EXAMPLE 4

Synthesis of PIB-b-PtBMA

Figure 10:
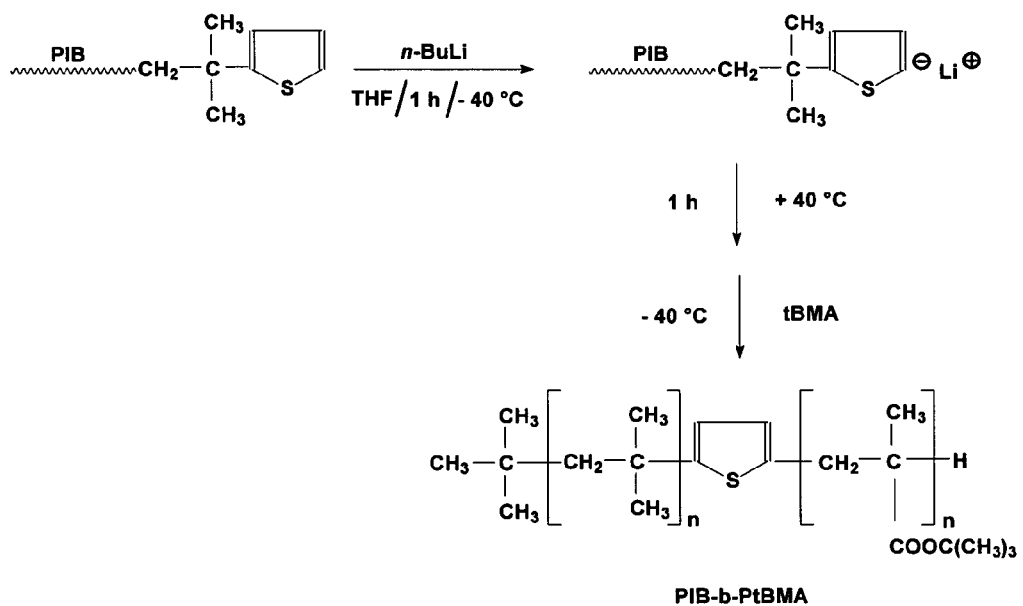
FIG. 10 is a schematic diagram illustrating the synthesis of PIB-b-PtBMA block copolymer.

The synthesis of PIB-b-PtBMA was accomplished by using lithiated PIB-T as an anionic macroinitiator of tBMA polymerization in THF (FIG. 10).

All copolymerizations were carried out in 1 L stirred glass reactor (Büchi) with a thermostated cooling jacket, steel capillary connections to introduce gases and solvents, and devices to measure temperature and pressure. Solvents were directly introduced from the distillation apparatus into the reactor. Monomer was introduced from glass ampoules via spherical joint or with dry syringe. Solutions of n-BuLi and macroinitiator (PIB-T) were handled with syringes. In a typical procedure 5 mL (8 mmol) n-BuLi solution were added to 400 mL purified THF and aged at room temperature overnight.

On the next day macroinitiator and n-BuLi were introduced and cooled to −40° C. See Auschra, C. Stadler., R. *Polymer Bulletin* 1993, 30, 257-264. Specifically, 1.21 g (0.355 mmol) of PIB-T ($M_n$=3.40×10$^3$ g/mol) were freeze-dried from benzene solution for 8 h and then vacuum-dried for more than 10 h. On a vacuum line, the dried PIB-T was dissolved in THF and then the mixture was added to the stirred glass reactor and cooled to −40° C. 0.23 ml (0.368 mmol) n-BuLi solution was added with a dry syringe afterwards. The reaction was held at −40° C. for 1 h. 5.34 g (0.037 mol) tBMA was added in bulk to the macroinitiator solution. After 2.5 h the polymerization was quenched with methanol. Finally, the polymer was precipitated into isopropanol and dried under vacuum at room temperature. Two experiments were conducted. In the first experiment (see above) an equimolar amount of n-BuLi was used for the metalation. In the second experiment a fourfold excess of n-BuLi was used and the unreacted BuLi was destroyed by heating to +40° C. for 1 h.

Figure 11:
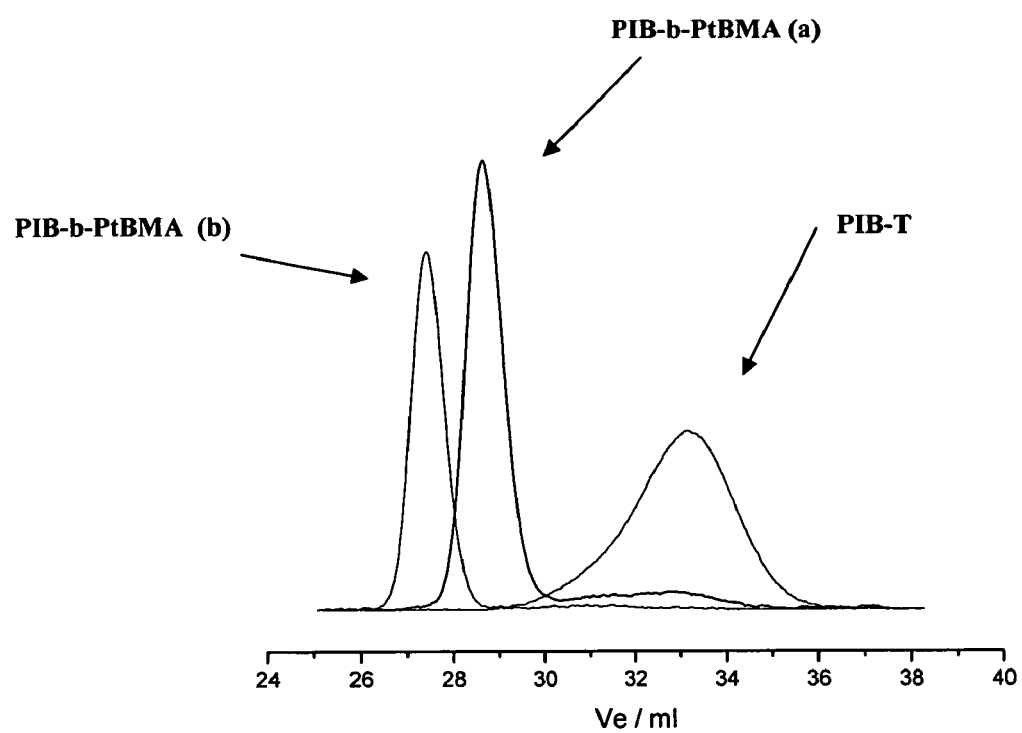
FIG. 11 illustrates SEC traces (RI detector) of PIB-b-PtBMA where (a) [n-BuLi]:[PIB-T]=1:1 and where (b) [n-BuLi]:[PIB-T]=4:1.

The complete characterization of block copolymers, i.e., the measurement of molar mass distribution in combination with the chemical distribution of the components of the desired architecture (diblock, triblock, multiblock), is useful for optimization of synthesis methods. Thus, the resulting polymers were first investigated by SEC. FIG. 11 shows the SEC eluograms (RI signal) for these block copolymers. The results are collected in Table 4. It can be seen that a peak appears for the unreacted PIB in the polymer lithiated by an equimolar amount of n-BuLi, however, no precursor is detected when an excess of n-BuLi is used.

TABLE 4

| | SEC and LACCC Characterization of PIB-b-PtBMA. | | | | |
|---|---|---|---|---|---|
| [nBuLi]/ | PIB[a] | | PIB-b-PtBMA[b] | | |
| [PIB-T] | 10$^{-3}$ $M_n$ | $M_w/M_n$ | 10$^{-3}$ $M_n$ | $M_w/M_n$ | $f_{block}$[c] |
| 1 | 3.23 | 1.26 | 36.5 | 1.02 | 0.89 |
| 4 | 3.46 | 1.28 | 60.2 | 1.02 | 0.98 |

[a]determined with linear PIB standards.
[b]determined with linear PtBMA standards.
[c]blocking efficiency, as determined by LACCC with ELSD detector.

Figure 12:
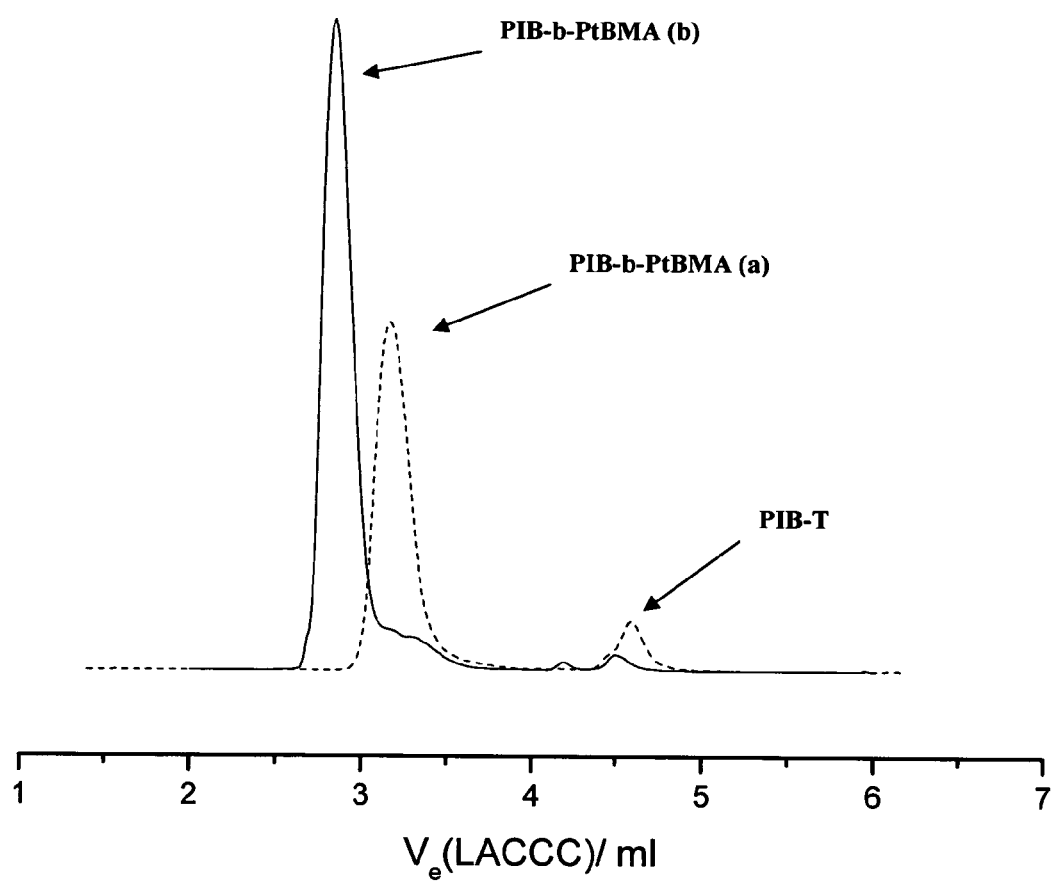
FIG. 12 illustrates LACCC chromatograms of PIB-b-PtBMA at critical conditions of PIB (ELSD Detector) where (a) [n-BuLi]:[PIB-T]=1:1 and where (b) [n-BuLi]:[PIB-T]=4:1.

Liquid chromatography at critical conditions of adsorption (LACCC) is a recent and most powerful method for the characterization of block copolymers according to the chemical heterogeneity. See Falkenhagen, J.; Much, H.; Stauf, W.; Müller, A. H. E. *Macromolecules* 2000, 33, 3687-3693; Pasch, H.; Brinkmann, C.; Gallot, Y. *Polymer* 1993, 34, 4100-4104; Pasch, H. *Macromol. Symp.* 1996, 110, 107-120. Separation of polymers at critical conditions of adsorption allows for the elution of homopolymers independent of their molar mass on porous separation phases using mixed mobile phases. Under these conditions, homopolymers can be separated according to the number and nature of functional groups, e.g., end groups or comonomers. Due to a better separation LACCC is more sensitive for a quantitative determination of the precursor content than SEC. FIG. 12 shows the LACCC chromatograms of the two PIB-b-PtBMA's at critical conditions of PIB. In line with the results of the lithiation of TMP-T, it is verified that the excess of n-BuLi is deactivated and that PIB-T$^-$,Li$^+$ is stable at +40° C. and it can initiate the polymerization of tBMA. These results show nearly quantitative blocking efficiency and the formation of the desired PIB-b-PtBMA block copolymer (Table 4).

EXAMPLE 5

Synthesis of Star-Shaped PIB Using SiCl$_4$

The synthesis of star-shaped PIB using SiCl$_4$ was carried out in a glass reactor. To the reactor, 40 mL of THF and 0.5081 g (0.149 mmol) of PIB-T ($M_n$=3.40×10$^3$ g/mol) were added, and then the mixture was cooled to −40° C. After 10 min of stirring 0.280 mL (0.448 mmol) of n-BuLi was transferred to the reactor by a transfer needle. n-BuLi was allowed to react with PIB-T for 60 min. Afterwards the system was warmed to 40° C. and stirred for 1 h in order to destroy the excess of n-BuLi. Then 4.34 µL (0.037 mmol) of SiCl$_4$ was added and allowed to react with the living chain ends for 2 h at 40° C. or for 22 h at 22° C. Finally, the reaction was quenched by adding 5 mL (3.93 g, 0.12 mol) of prechilled methanol. The product was precipitated into isopropanol and dried under vacuum at room temperature.

Figure 13:
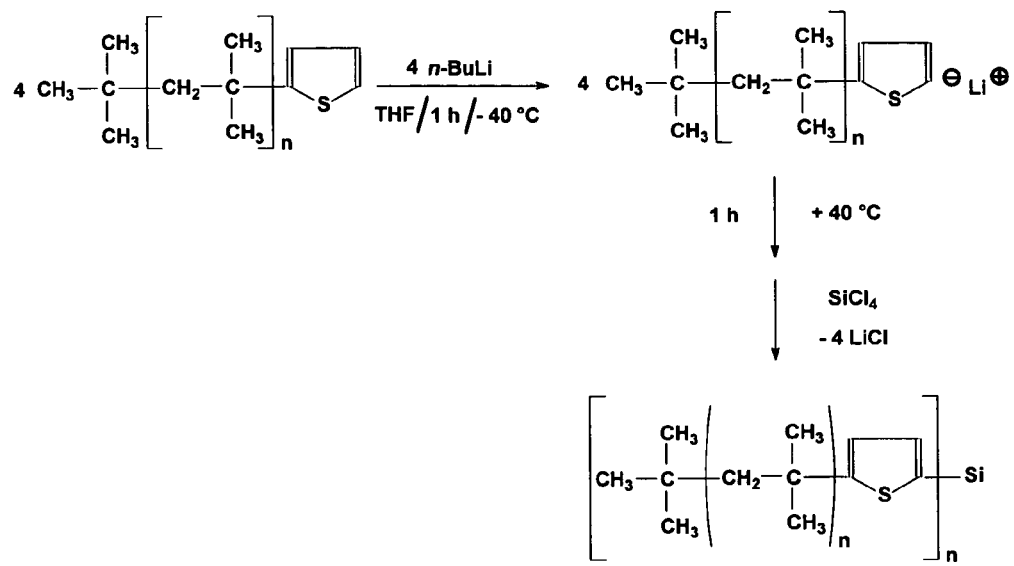
FIG. 13 is a schematic illustration of the synthesis of PIB stars.

In the synthesis of star polymers the linking reaction is usually the slowest step and star polymers made by cationic polymerization usually require cryogenic cooling. See Asthana, S.; Kennedy, J. P. *J. Polymer. Sci., Part A: Polym. Chem.* 1999, 37, 2235-2243. Up to now, no star coupling agent is known for living carbocationic PIB chain ends. Usually, coupling is brought about by the use of bifunctional monomers, e.g. divinylbenzene (see Asthana, S.; Kennedy, J. P. *J. Polymer. Sci., Part A: Polym. Chem.* 1999, 37, 2235-2243), yielding a mixture of stars with different arm numbers. A room-temperature linking method is described here, in which lithiated PIB-T is reacted with chlorosilanes, e.g., SiCl$_4$. Chlorosilanes have been used to couple anionic chain ends, e.g., living polybutadiene. Roovers, J. E. L. and S. Bywater (1972). "*Macromolecules* 1972, 5, 385. FIG. 13 shows the synthetic strategy for the preparation of star PIB using lithiated PIB-T and SiCl$_4$.

Figure 14:
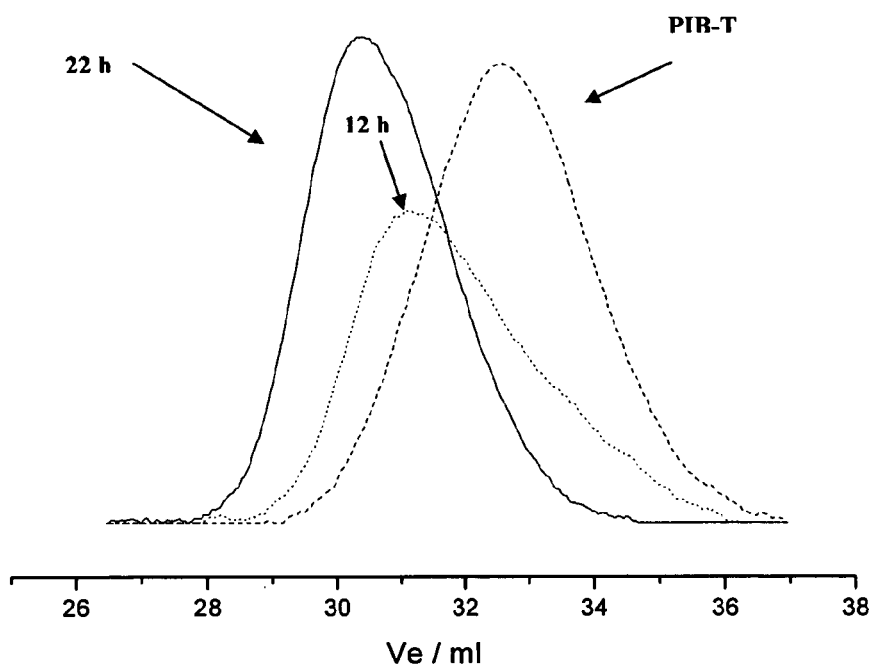
FIG. 14 illustrates SEC traces (RI detector) of the arm precursor (PIB-T)) and samples taken during the linking reaction of PIB-T with SiCl$_4$ (Exp. 2).

A first experiment was carried out at 40° C., using a ratio of [PIB-T]:[SiCl$_4$]=4:1. The reaction was terminated after 2 h. GPC data indicate the formation of a star with 3.9 arms on average. Another experiment with slightly different reaction conditions (room temperature, up to 22 h reaction time) was conducted. After 12 h, star formation was well underway, however, a large fraction of unreacted PIB chains remained (see FIG. 14). The final star polymer was obtained after 22 h reaction time. The polymer at this stage shows the formation of a star with 3.7 arms on average (Table 5). A certain amount of three-armed stars could not be excluded, which may be due, for example, to insufficient reaction times or to steric hindrance caused by the thiophene ring.

TABLE 5

| | SEC Characterization of PIB Star. | | | |
|---|---|---|---|---|
| T/reaction time | 10$^{-3}$ M$_p$ (arm)$^a$ (g/mol) | 10$^{-3}$ M$_{p,app}$ (star)$^a$ (g/mol) | 10$^{-3}$ M$_p$ (star) (g/mol) | N$_{arm}$ |
| +22° C./22 h | 4.00 | 10.1 | 14.6$^b$ | 3.7 |

$^a$determined with linear PIB standards.
$^b$determined with viscosity detector using universal calibration.

Although various embodiments are specifically illustrated and described herein, it will be appreciated that modifications and variations of the present invention are covered by the above teachings and are within the purview of the appended claims without departing from the spirit and intended scope of the invention.

What is claimed is:

1. A block copolymer comprising a first polymer block comprising cationically polymerized monomers linked to a second polymer block comprising anionically polymerized monomers by a single

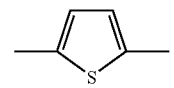

group.

2. The block copolymer of claim 1, wherein said first polymer block is selected from a polyolefin block, a poly (vinyl ether) block, and a poly(vinyl amine) block.

3. The block polymer of claim 1, wherein said second polymer block is selected from a poly(N,N-disubstituted acrylamide) block, a poly(N,N-dimethacrylamide) block, a poly(alkyl acrylate) block, a poly(alkyl methacrylate) block, a poly(vinyl amide) block, a poly(acrylonitrile) block, a poly (methacrylonitrile) block, a poly(vinyl pyridine) block, a poly(isopropenyl pyridine) block, a poly(n-alkyl isocyanate) block, a poly(ethylene oxide) block, a poly(.epsilon.-caprolactone) block, a poly(L,L-lactide) block, a poly(D,D-lactide) block, and a poly(D,L-lactide) block.

4. A polymer comprising a polymer block comprising cationically polymerized monomers linked to a halogenated silane residue or a carbosilane residue by a single

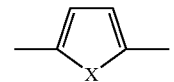

group, where —X— is selected from —S—, —O—, —NH— and —NR— where R is an alkyl group or an aryl group.

* * * * *